(12) United States Patent
O'Mara et al.

(10) Patent No.: US 9,621,758 B2
(45) Date of Patent: Apr. 11, 2017

(54) IMAGING ASSEMBLY FOR SCANNER

(71) Applicant: Opex Corporation, Moorestown, NJ (US)

(72) Inventors: Kerry O'Mara, Lambertville, NJ (US); David Helmlinger, Mount Laurel, NJ (US)

(73) Assignee: OPEX CORPORATION, Moorestown, NJ (US)

( * ) Notice: Subject to any disclaimer, the term of this patent is extended or adjusted under 35 U.S.C. 154(b) by 0 days.

(21) Appl. No.: 14/424,599

(22) PCT Filed: Aug. 29, 2013

(86) PCT No.: PCT/US2013/057215
§ 371 (c)(1),
(2) Date: Feb. 27, 2015

(87) PCT Pub. No.: WO2014/036220
PCT Pub. Date: Mar. 6, 2014

(65) Prior Publication Data
US 2015/0229801 A1 Aug. 13, 2015

Related U.S. Application Data

(60) Provisional application No. 61/694,385, filed on Aug. 29, 2012, provisional application No. 61/794,285, filed on Mar. 15, 2013.

(51) Int. Cl.
H04N 1/04 (2006.01)
H04N 1/12 (2006.01)
(Continued)

(52) U.S. Cl.
CPC ........... H04N 1/123 (2013.01); G02B 26/101 (2013.01); H04N 1/028 (2013.01); H04N 1/1215 (2013.01)

(58) Field of Classification Search
CPC ...................................... H04N 1/123
See application file for complete search history.

(56) References Cited

U.S. PATENT DOCUMENTS 6,693,748 B1    2/2004  Fujimoto et al.
6,862,115 B1 *  3/2005  Kondo .......................... 358/474
(Continued)

FOREIGN PATENT DOCUMENTS

EP              785664       2/2004

OTHER PUBLICATIONS

International Preliminary Report issued in PCT/US13/57215 on Mar. 3, 2015.
(Continued)

*Primary Examiner* — Cheukfan Lee
(74) *Attorney, Agent, or Firm* — Dann, Dorfman, Herrell and Skillman; Stephen Eland

(57) ABSTRACT

A system for processing document to scan the documents to obtain optical image data representing the document is provided. The system (10) includes elements that reduce or eliminate the effects of debris that can create streaks in the scanned images. One element is a recess (174) in the lens (170) through which an imaging device (60) scans the document. Another element is a guide (80) having an opening (84) opposing the lens (70, 170) of the imaging device (60). The opening (84) reduces or eliminates light reflecting off the guide back to the imaging device so that the area around the document is scanned as black.

19 Claims, 5 Drawing Sheets

(51) Int. Cl.
   *G02B 26/10*   (2006.01)
   *H04N 1/028*   (2006.01)

(56) References Cited

U.S. PATENT DOCUMENTS

| | | | |
|---|---|---|---|
| 7,626,735 B2 | 12/2009 | Mizuhashi et al. | |
| 7,646,515 B2* | 1/2010 | Ichinose | 358/496 |
| 7,715,779 B2 | 5/2010 | Kondo et al. | |
| 7,982,926 B2* | 7/2011 | Ishikawa et al. | 358/496 |
| 8,508,816 B2* | 8/2013 | Nomura et al. | 358/498 |
| 2006/0029446 A1* | 2/2006 | Shyu | 399/390 |
| 2008/0100886 A1* | 5/2008 | Kobayashi | 358/498 |
| 2008/0285093 A1* | 11/2008 | Sheng et al. | 358/474 |

OTHER PUBLICATIONS

International Search Report & Written Opinion issued in PCT/US13/57215 on Dec. 13, 2013.

* cited by examiner

IMAGING ASSEMBLY FOR SCANNER

PRIORITY CLAIM

This application is a national phase entry of International Application No. PCT/US13/57215 filed on Aug. 29, 2013 which claims benefit to U.S. Provisional Application No. 61/694,385 filed Aug. 29, 2012 and U.S. Provisional Application No. 61/794,285 filed Mar. 15, 2013. The entire disclosure of each of the foregoing applications is hereby incorporated herein by reference.

FIELD OF THE INVENTION

The present invention relates to the field of scanning systems and in particular to systems that scan and sort items such as documents and pieces of mail.

BACKGROUND

Often scanned document images are analyzed and decisions are made based on the analysis of the image. Additionally, frequently the image is stored and referenced during further processing rather than using the actual item, particularly if the item is a document.

If the scanned image is not acceptable the user must retrieve the original document and re-scan the image. This significantly reduces the efficiency of the system. Therefore, it is desirable to mitigate problems that can lead to poor images.

A common problem that results in poor images is dust accumulation at the scanner. If the scanner uses a moveable head, the dust simply shows up as a small spot or speck on the image. In contrast, when the scanner incorporates a stationary head and the item travels past the head, the dust shows up as an elongated streak along the length of the document.

Additionally, scanners commonly utilize a guide to guide the documents toward or against a glass plate and the scanner scans the image as the document passes across the plate. One commonly used guide is a black foam or rubber roller that urges the documents toward the plate. During use, such rollers accumulate dust and eventually become lighter, and therefore it becomes more difficult to distinguish the document image from the background. Eventually, the roller needs to be cleaned or replaced.

Accordingly, although many attempts have been made to mitigate the impact of dust and debris adjacent the image, dust and debris remain problem.

SUMMARY OF THE INVENTION

In light of the foregoing, an improved scanner is provided for a sorting system.

According to one aspect, the present invention provides a system for processing documents to obtain optical image data. The system includes an imager for scanning a document to obtain image data, wherein the imager comprises a lens through which the imager scans the document. The imager has a depth a field that includes a surface of the lens, wherein elements within the depth of field are generally in focus and elements outside the depth of field are generally not in focus. A document transport conveys the document along a document path over the lens and the imager scans the document as the transport conveys the document over the lens. A guide opposing the lens guides the document toward the lens as the document transport conveys the document past the imager. The guide comprises an opening opposing the imager that is configured so that portions of the guide exposed to the imager are positioned outside the depth of field of the imager.

According to another aspect, the present invention provides a system for processing documents to obtain optical image data that includes an imaging element, a lens having a recess and a document transport. The imaging element is operable to scan a document to obtain image data. The lens is positioned so that the recess overlies the imaging element. In this way, the imaging element scans the document through the recess and the recess has a bottom outside the focus of the imaging element. The document transport conveys the document over the lens and the imaging element scans the document as the document transport conveys the document over the lens.

DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Figure 1:
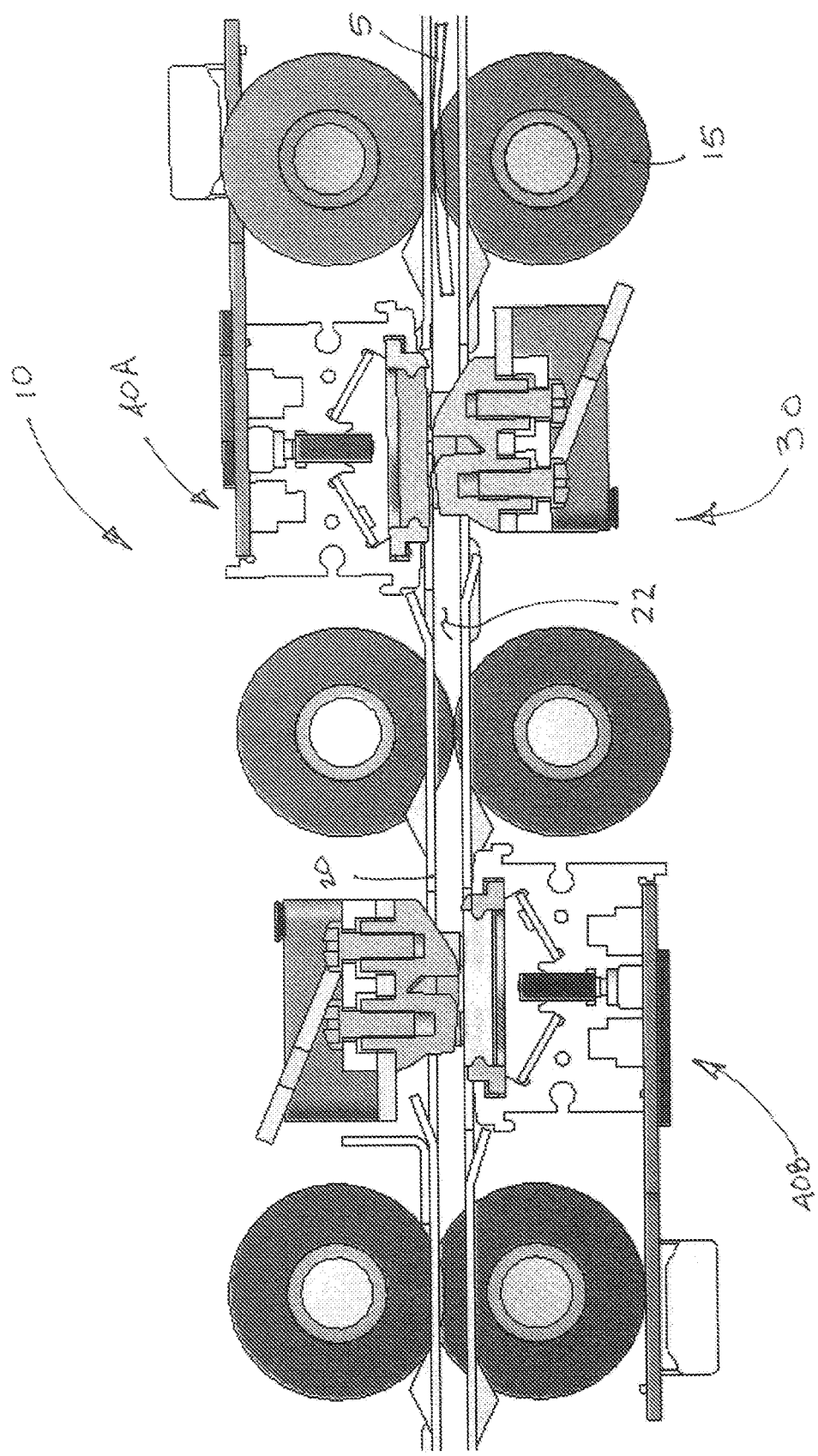
FIG. 1 is a side elevation view of an imaging station
Figure 2:
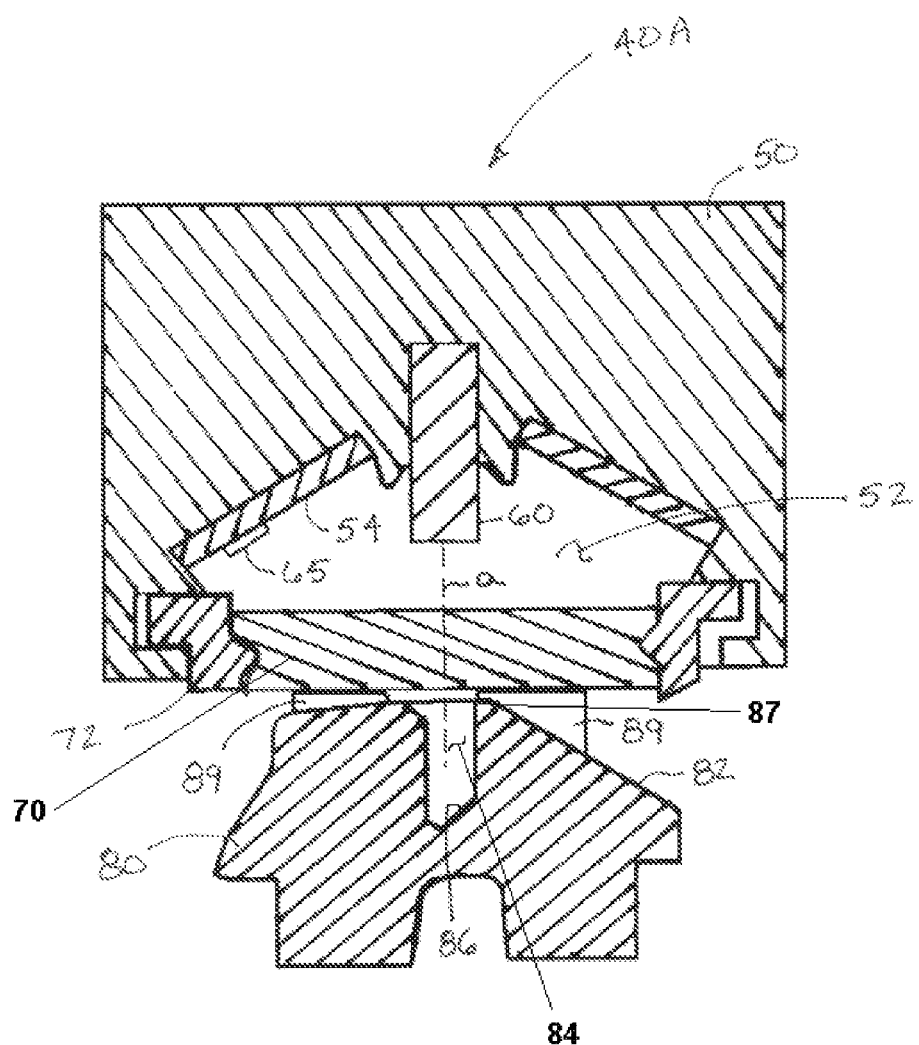
FIG. 2 is an enlarged cross-section view of an imaging assembly of the imaging station illustrated in FIG. 1.

Referring now to the drawings in general and to FIGS. 1-2 specifically, a document imaging system is designated generally 10. The system 10 includes a plurality of rollers 15 that drive documents 5 along a document path 22, along with guides 20 that guide the document as it is conveyed along the document path. An imaging station 30 position along the document path 22 is operable to scan documents 5 to obtain image data for the documents. The image data can be processed and used by the system and/or exported and stored for subsequent use or viewing. For instance, the image data may be exported to a file server or other device for storing data.

The system 10 may be configured for single-sided or double-sided scanning. The embodiment in FIG. 1 is configured to provide double-sided scanning, so the imaging station comprises a front imaging assembly 40A and a back imaging assembly 40B. As a document 5 passes through the imaging station 30, the document first passes the front imaging assembly 40A, which scans the front side of the document to obtain image data for the front side of the document. After exiting the upper imaging assembly 40A, the document is conveyed to the back imaging assembly 40B, which scans the back side of the document to obtain image data for the back side of the document. The document then exits the imaging station 30. From the imaging station, the document may be further processed, such as by sorting according to one or more characteristics. For instance, the documents may be sorted according to a document characteristic identified from the scanned image data. Alternatively, the document may be sorted according to a characteristic of other documents. For instance, documents from a packet or a transaction may be processed together and/or sorted together so that the documents remain associated with one another. It should be understood, that sorting is simply one example of how the document may be processed after being discharged from the imaging station. In other embodiments, the documents may simply be discharged into an output area or bin after leaving the imaging station.

The frontside and backside imaging assemblies 40A,B are configured substantially similarly, except that the backside imaging assembly 40B is oriented oppositely of the frontside imaging assembly 40A as can be seen in FIG. 1. Accordingly, in the following description, the details of the front imaging assembly 40A are provided and it should be understood that the details of the back imaging assembly 40B are substantially the same.

The front imaging assembly 40A comprises an imaging device 60 positioned in a housing 50. The housing 50 is an elongated channel that extends across the width of the document path. In the present instance, the housing is formed of metal, such as aluminum. However, the housing can be formed of a variety of generally rigid materials. The housing 50 includes an elongated cavity 52 that extends the length of the housing. The imaging device 60 is positioned in the base of the cavity 52 and directed toward the paper path. In particular, as shown in FIG. 2, the imaging device is directed downwardly, whereas the imaging device in the backside imaging assembly 40B is directed upwardly.

The imaging device 60 may be any of a variety of digital imaging devices configured to scan documents at a high speed to obtain image data corresponding to the documents, including but not limited to line scan cameras, charge-coupled devices and contact image sensors (CIS). In the present instance, the imaging device 60 is a CIS array extending across the width of the document path, so that the CIS array extends across a width at least as wide as the widest document the system 10 is configured to process.

The imaging assembly 40A may also include an illumination source 65 for providing light to illuminate the documents 5. In the present instance, the side walls 54 of the cavity are angled and a lighting element is mounted onto one or both of the side walls. In this way, the lighting element 65 provide a source of light directed toward the document path so that the lighting element illuminates the documents as the documents are conveyed along the document path. In the frontside imaging assembly 40A, the lighting element is directed downwardly toward the document path. In the backside imaging assembly 40B, the lighting element is directed upwardly toward the document path.

A lens or cover 70 extends over the length of the housing to enclose the opening in the cavity 52 to impede entrance of debris into the housing 50. The lens has a longitudinal length that extends across the width of the document path. The lens 70 has a width along the direction of the paper path, wherein the lens width is substantially smaller than the longitudinal length of the lens. The lens 70 may be formed as a platen from any of a variety of substantially transparent materials, including glass and plastic. Specifically, the lens may have a generally planar surface that engages or presses against the document to flatten the document as the document is conveyed along the document path. The documents are conveyed over the lens 70 as the documents are conveyed along the document path 22, and the sensor array 60 scans the document through the lens 70 to obtain image data for the document.

The lens 70 may be mounted directly onto the housing. However, in the present instance the lens is mounted onto a lens holder 72 that engages the edges of the cover 70. The lens holder 72 includes flanges that project outwardly along the length of the lens holder so that the flanges project from the longitudinal sides of the lens. The flanges project into slots in the housing 50 to connect the lens and holder 70/72 to the housing. Additionally, the lens holder further includes a pair of detents or protrusions that project inwardly to engage the lens to hold the lens in place in the holder. Specifically, the lens 70 may include one or more recesses along the longitudinal edges of the lens and the detents engage the recesses in the lens to retain the lens in the holder.

A guide 80 opposing the imaging assembly 40A guides documents against the cover 70 as the documents are conveyed along the document path 22. The guide is an elongated element that extends across the width of the document path. In the present instance, the guide is coextensive with the width of the imaging assembly 40A, so that the guide overlies substantially the entire width of the imaging assembly. More specifically, the guide 80 overlies substantially the entire width of the sensor array 60.

The guide urges the documents against the lens 70 as the documents are conveyed along the document path so that the documents are pressed generally or substantially flat against the lens. Since the guide may be wider than the width of some of the documents being scanned, the imaging device 60 may scan the image of the lateral edges of the guide that extend beyond the lateral edges of the documents. Accordingly, the guide 80 may be configured to substantially reduce light reflected back toward the imaging array. In this way, as a document passes between the guide 80 and the imaging assembly 40A, the portions of the guide that are not covered by the document will scan as substantially black. Therefore, an image processor can process the image data to identify the edges of the document by using the dark black edges as an indicator of the document edge. Similarly, the leading and trailing edges of the document will appear as substantially black because the gap between successive documents will leave the guide uncovered.

The guide 80 is preferably formed of a substantially light absorbing material. For instance, in the present instance, the guide is formed of plastic and has a flat black surface finish. The finish can either be a coating or the type of material used to form the guide.

The guide 80 may also include a slot 84 that extends the width of the document path 22. More specifically, in the present instance, the slot 84 extends the width of the sensor array 60. The slot may extend through the entire thickness of the guide 80 or the slot may have a bottom so that the slot forms a cavity. In the present instance, the slot extends through the thickness of the guide along substantially the entire length of the guide. However, the slot includes cross ribs 86 that span the width of the slot to increase the rigidity of the guide. Preferably the ribs are also recessed having a bottom surface as shown in FIG. 2. In the present instance, the bottom of the rib 86 is tapered so that the bottom forms an acute angle with the axis of the sensor array (designated "a" in FIG. 2). In this way, the tapered surface will tend to scatter the light against surfaces in the cavity rather directing the light back toward the sensor. In the present instance, the interior surface of the slot 84 and the ribs 86 are also substantially light absorbing surfaces, such as flat black. Additionally, the interior surface may be covered with a light absorbing finish, such as flocking.

In the present instance, the depth of slot 84 is deeper than the depth of focus for the sensor array 60. Specifically, the depth of focus of the sensor array is generally quite shallow, on the order of 0.010 inches or 0.3 mm, and the depth of the slot 84 is at least several millimeters. In this way, the portion of the guide 80 aligned with the imaging device is spaced apart from the focal plane of the imaging device. Further still, the portion of the guide aligned with the imaging device is sufficiently spaced from the focal plane of the imaging device that the guide 80 is substantially outside the depth of field of the imaging device, so that the guide is out of focus. In this way, the guide is both out of the focal plane and reflects little to no light so that the portion of the guide overlying the imaging device that is outside the lateral edges of a document being scanned appears substantially black.

Figure 3:
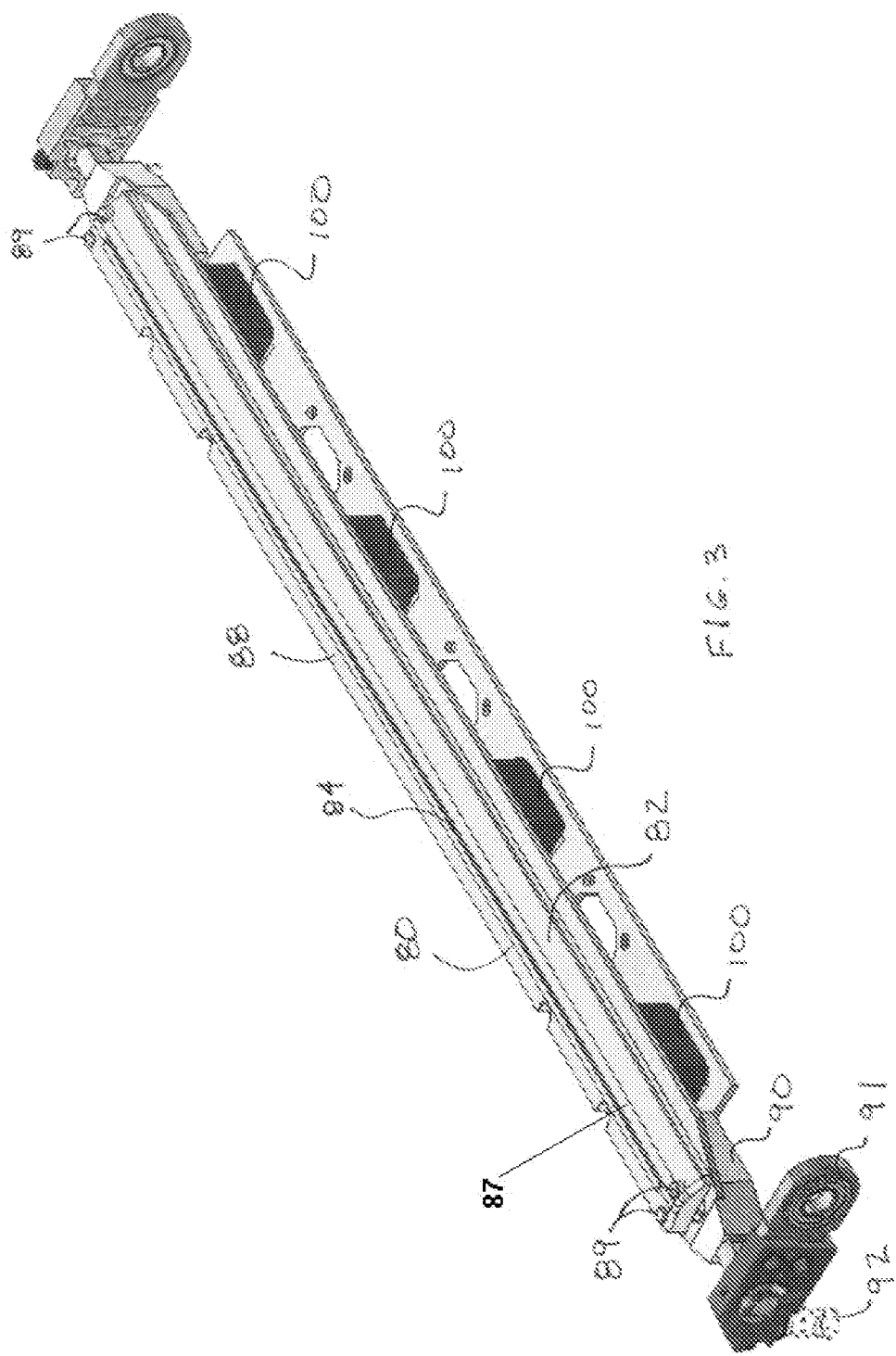
FIG. 3 is a perspective view of a document guide of the imaging station illustrated in FIG. 1.

The guide may also be formed to direct the documents toward the lens 70 of the imaging assembly 40A. For instance, in the present instance, the leading edge 82 of the guide 80 comprises an angled surface that tapers toward the imaging assembly 40A forming a tip 87 having a flat contact surface as shown in FIGS. 2-3. In this way, the leading edge of the guide directs the leading edge of an incoming document toward the imaging assembly so that the face of the document is urged toward the lens 70. The trailing edge 88 of the guide is also angled so that it tapers away from the imaging assembly. Further still, preferably the trailing edge is formed to reduce the likelihood that an edge of the document will catch on the trailing edge of the slot 84 as the document passes over the guide 80. Specifically, in the present instance, the trailing edge of the slot 84 is rounded so that the trailing edge tapers away from the lens 70, while the tip 87 of leading edge 82 projects toward the lens so that the gap between the lens and the leading edge of the guide 80 adjacent the slot is less than the gap between the lens and the trailing edge of the guide adjacent the slot.

The guide 80 may also include contact elements for positioning the guide relative to the imaging assembly 40A. For example, in the present instance, the guide 80 includes tabs or pads 89 that protrude outwardly. As shown in FIG. 2, the pads 89 protrude closer to the lens 70 of the imaging assembly 60 than the tip 87 leading edge 82. Referring to FIG. 3, the tabs are positioned at the longitudinal ends of the guide, outside the document path. Specifically, the first pair of pads is positioned at the proximal end of the guide 80 and the second pair is positioned at the distal end of the guide, so that the documents pass between the pads as the documents pass over the imaging assembly.

Referring to FIG. 3, the guide 80 is mounted on a bracket that provides rigidity to prevent the slot from expanding. The guide 80 may also include a plurality of cross-ribs to provide lateral strength. However, as shown in FIG. 2, any cross element in the cavity is recessed and configured to scatter light into the cavity rather than back toward the sensor array 60.

A biasing element biases the guide 80 toward the imaging assembly so that the guide directs documents toward the imaging assembly. However, the biasing element allows the guide to move away from the imaging assembly to provide a larger gap for thicker documents. In the present instance, the guide 80 is mounted on a pair of pivotable arms 91 that are biased by springs 92.

The system may also include one or more air movement elements for providing a flow of air over the imaging assembly 40A. For example, in the present instance, a plurality of fans 100 are positioned below the guide and are configured to blow a stream of air through the slot 84 toward the imaging assembly. Although the slot in FIG. 2 appears to be a closed cavity, the cross-section is open to the lower side of the guide (i.e. the slot includes openings through the bottom wall 86). The fans 100 may be mounted on the support bracket 90 and spaced along the length of the bracket as shown in FIG. 3. In this way, the fans 100 provide a stream of air along the width of the document path.

An element may be provided to limit the build-up of static charge that could be created from the documents passing over the guide 80. For instance, a corona wire or points can be integrated into the slot 84, so the fans drive a flow of ionized air through the slot 84. The fans are positioned to blow debris away from the lens 70 before the debris can settle on the cover and thereby impair the image quality. Specifically, the fans may be configured to provide an air-knife, and use the Coanda-effect to entrain air around the lead side of the guide to drive debris along the direction of flow for the documents, rather than settling on the lens 70. Alternatively, the fans or other air-moving element(s) can be positioned remotely from guide and hose or ducting can provide the flow of air to drive debris away from the cover.

Figure 4:
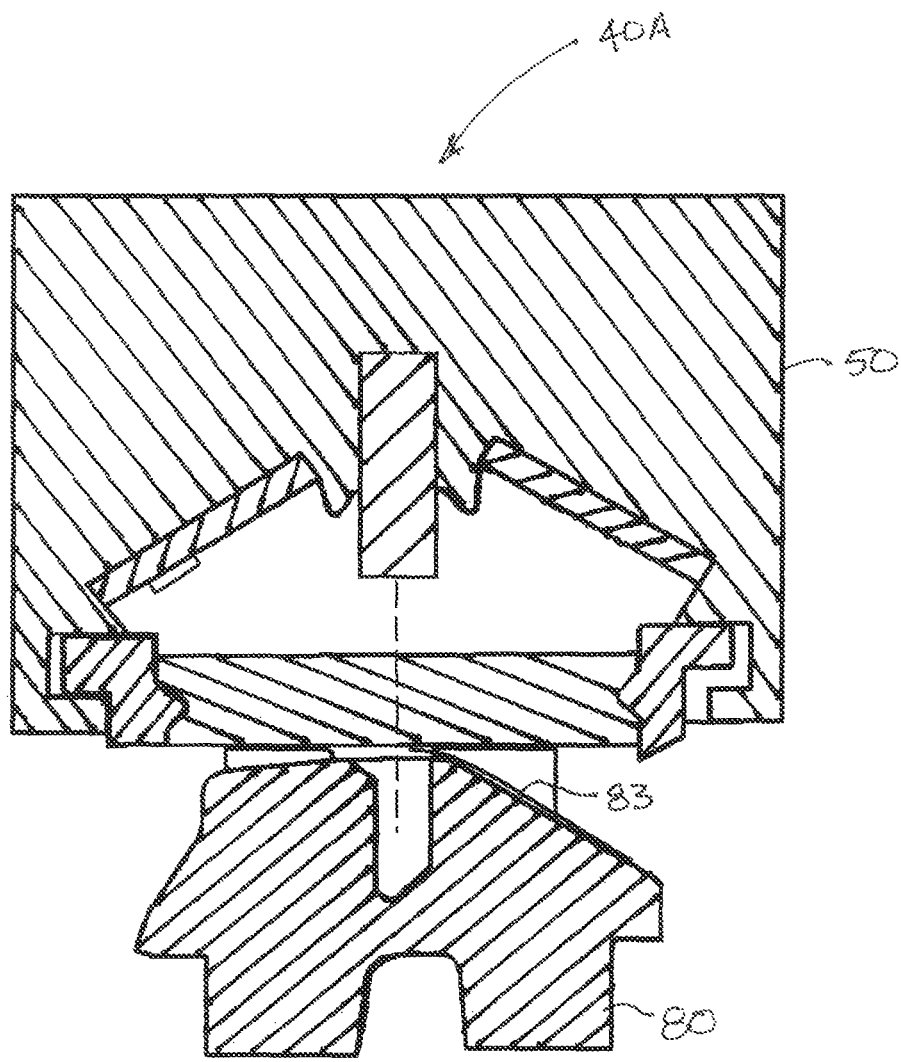
FIG. 4 is an enlarged cross-sectional view of an alternate imaging assembly.

Referring now to FIG. 4, an optional wiper for the imaging assembly 40A is illustrated. The imaging assembly 40A is substantially similar to the imaging assembly discussed above, except that the imaging assembly includes a wiper 83 attached to the leading edge of the guide 80. The wiper 83 may be a thin plastic sheet (e.g. 0.002" polyester) or fine bristles. By providing a wiper, the gap between the guide 80 and the cover 70 of the imaging assembly can be increased without creating a separation between the document and the cover that would reduce the quality of the image. Specifically, the wiper 83 is a resiliently flexible element that fills the gap between the guide 80 and the lens 70 of the imaging assembly 40A. As the document transport 15 conveys the document along the document path, the leading edge of the document engages the wiper so that the wiper deforms to provide clearance for the document to pass between through the gap between the guide 80 and the imaging assembly 40A. As the wiper deforms, the resiliency of the wiper causes the wiper to urge the document toward the imaging assembly 40A.

Figure 5:
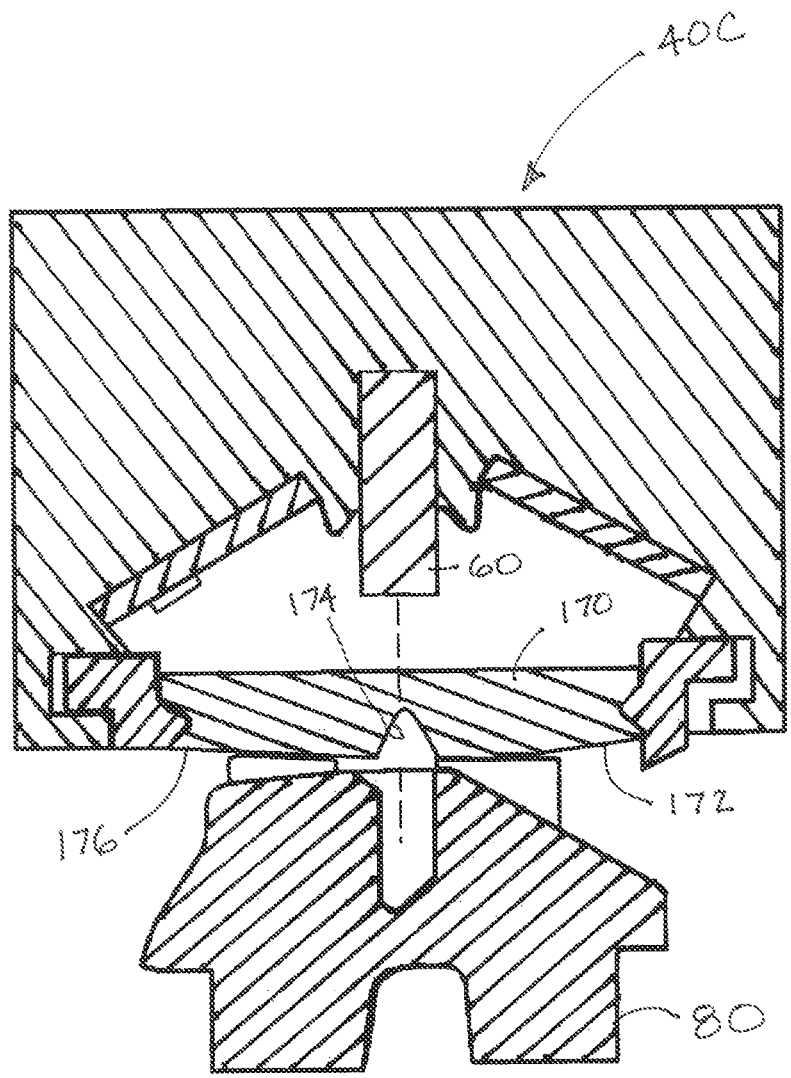
FIG. 5 is an enlarged cross-sectional view of a second alternate imaging assembly.

Referring to FIG. 5, an alternate imaging assembly 40C is illustrated. The alternate imaging assembly is substantially the same as the imaging assembly 40A described above, except for the lens. The lens 170 includes a recess 174 aligned with the sensor array 60. The recess 174 has a depth that is greater than the depth of focus of the sensor array 60. In this way, debris on the lens will tend to settle in the bottom of the recess 174. Since the recess is outside the focal area of the sensor array, the debris will not normally degrade the quality of the image. In the present instance, the leading edge 172 of the lens 170 tapers away from the leading edge of the guide and the trailing edge 176 of the lens also tapers away from the trailing edge of the guide. Therefore, the gap between the leading edge 172 of the lens 170 and the tip 87 of the leading edge of the guide 80 is greater than the gap between the trailing edge 176 of the lens 170 and the trailing edge 88 of the guide 80. In this way, the document will have less of a tendency to catch on the recess as the documents are conveyed across the cover.

It will be recognized by those skilled in the art that changes or modifications may be made to the above-described embodiments without departing from the broad inventive concepts of the invention. For instance, the lens of the imaging assembly may be modified to have a different shape than the recess 174 described above, while still having a surface that is spaced apart from the focal plane of the imager so that debris will tend to settle on the surface out of the depth of field for the imaging assembly. It should therefore be understood that this invention is not limited to the particular embodiments described herein, but is intended to include all changes and modifications that are within the scope and spirit of the invention as set forth in the claims.

The invention claimed is:

1. A system for processing documents to obtain optical image data, comprising:
   an imager for scanning a document to obtain image data, wherein the imager comprises a cover through which the imager scans the document and the imager has a depth a field that includes a surface of the cover, wherein elements within the depth of field are generally in focus and elements outside the depth of field are generally not in focus;
   a document transport for conveying the document along a document path over the cover, wherein the imager scans the document as the transport conveys the document over the cover;
   a guide opposing the cover for guiding the document toward the cover as the document transport conveys the document past the imager, wherein the guide comprises an opening opposing the imager, wherein the opening is configured so that portions of the guide exposed to the imager are positioned outside the depth of field of the imager.

2. The system of claim 1 wherein the document path has a width and the opening has a length that extends across the width of the document path so that edges of the document fall within the length of the opening.

3. The system of claim 1 comprising a fan for providing air flow through the opening.

4. The system of claim 1 comprising a biasing element biasing the guide toward the cover.

5. The system of claim 1 wherein a portion of the guide extends beyond a width of the document so that the portion is exposed to the imager, wherein the opening is configured so that substantially the entire portion of the guide that is exposed to the imager is outside the depth of field of the imager.

6. The system of claim 1 comprising a non-volatile storage medium for storing the image data so that the image data can be subsequently retrieved.

7. The system of claim 6 wherein the storage medium comprises a file server.

8. A system for processing documents to obtain optical image data, comprising:
   an imaging element for scanning a document to obtain image data;
   a cover having an upper surface forming a contact surface upon which the document is conveyed, wherein an opening is formed in the upper surface and the opening is aligned with the imaging element so that dust or debris can fall through the opening to a lower surface, wherein the imaging element scans the document through the opening and wherein the lower surface is outside the focus of the imaging element;
   a document transport for conveying the document across the contact surface of the cover, wherein the imaging element scans the document as the document transport conveys the document across the opening in the contact surface of the cover; and
   a guide opposing the cover urging the document against the cover.

9. The system of claim 8 wherein the imaging element has a depth of field so that elements within the depth of field are generally in focus and elements outside the depth of field are generally not in focus, wherein the opening is positioned relative to the imaging element so that debris on the lower surface is outside the depth of field of the imaging element.

10. The system of claim 8 comprising a housing having a cavity within which the imaging element is mounted, wherein the cover is mounted over the imaging element within the housing.

11. The system of claim 8 comprising an illumination element for illuminating the document, wherein light from the illumination element passes through the cover.

12. The system of claim 11 comprising a guide for guiding the document toward the cover, wherein the guide comprises a recess opposing the illumination element so that light from the illumination element shines into the recess of the guide along portions of the guide that extend beyond a width of the document.

13. The system of claim 12 wherein the recess in the guide is configured to substantially prevent light being reflected back to the imaging element from the guide.

14. The system of claim 12 wherein the guide is spaced from the cover creating a gap through which the document passes, wherein the document transport conveys the document across the opening in the cover and the recess in the guide.

15. The system of claim 14 wherein the recess in the guide has a leading edge wall and a trailing edge wall, wherein the gap through which the document passes is wider adjacent the trailing edge wall than adjacent the leading edge wall.

16. The system of claim 15 wherein the trailing edge wall of the recess is rounded to impede a leading edge of the document from snagging on the recess as the document is conveyed over the cover.

17. The system of claim 8 wherein the recess is configured so that debris in the bottom of the recess does not create streaks in the image data when the imaging element scans the document.

18. The system of claim 8 comprising a guide for guiding the document wherein the guide is spaced from the cover to create a gap through which the document passes and wherein the system comprises a resiliently deformable wiper a portion of which is disposed within the gap.

19. The system of claim 18 wherein a leading edge of the document contacts the wiper, thereby deflecting the wiper when the document is being conveyed by the document transport, wherein the deflected wiper biases the document toward the cover.

* * * * *